(12) United States Patent
Hanatsuka et al.

(10) Patent No.: US 7,486,501 B2
(45) Date of Patent: Feb. 3, 2009

(54) INFORMATION PROCESSING DEVICE

(75) Inventors: Akira Hanatsuka, Tokyo (JP); Hiroyuki Ozawa, Tokyo (JP); Takashi Sonehara, Nagano (JP)

(73) Assignee: Sony Corporation (JP)

( * ) Notice: Subject to any disclaimer, the term of this patent is extended or adjusted under 35 U.S.C. 154(b) by 84 days.

(21) Appl. No.: 11/800,658

(22) Filed: May 7, 2007

(65) Prior Publication Data

US 2007/0297124 A1     Dec. 27, 2007

(30) Foreign Application Priority Data

May 15, 2006    (JP)   ............................ P2006-135145

(51) Int. Cl.
*H05K 7/02*     (2006.01)
(52) U.S. Cl. ........................ 361/680; 345/158; 710/313; 707/104.1
(58) Field of Classification Search .................. 345/1.1, 345/158, 672; 715/234, 742; 707/10, 101, 707/104.1; 710/2, 62, 100, 313; 600/130, 600/345; 206/306; 361/679–687, 724–727
See application file for complete search history.

(56) References Cited

U.S. PATENT DOCUMENTS 6,784,870 B2 *    8/2004    Yin .............................. 345/156
2006/0164799 A1 *    7/2006    Varela ......................... 361/680

FOREIGN PATENT DOCUMENTS

JP     2003-288154 A     10/2003

* cited by examiner

*Primary Examiner*—Hung V Duong
(74) *Attorney, Agent, or Firm*—Lerner, David, Littenberg, Krumholz & Mentlik, LLP

(57) ABSTRACT

An information processing device may include a device main body including a keyboard, and a display slidably supported by the device main body, wherein the device main body may include a support section for slidably supporting the display, and a pair of grip sections positioned on both sides of the display continuously to the support section and to be grasped by the user, the pair of grip sections may be formed so as to protrude in a display arrangement direction in which the display may be arranged with respect to the support section, and an operation section to be operated by the user may be disposed on a surface of the pair of grip sections in the direction of protrusion.

6 Claims, 16 Drawing Sheets

INFORMATION PROCESSING DEVICE

CROSS-REFERENCE TO RELATED APPLICATIONS

This application claims priority from Japanese Patent Application No. JP 2006-135145 filed in the Japanese Patent Office on May 15, 2006, the entire content of which is incorporated herein by reference.

BACKGROUND OF THE INVENTION

1. Technical Field

The present invention relates to a technical field regarding an information processing device. In detail, the invention relates to a technical field for achieving improvement in the grasping property and the operability by providing a pair of grip sections protruding towards predetermined directions on both sides of a display in the main body of the device.

2. Related Art

In recent years, in information processing devices such as personal computers, small sized devices superior in portability has been developed.

Such a small sized information processing device is provided with a part thereof as a grip section grasped by the user, and the user can perform various inputs by operations to operation buttons or perform various inputs by using a stylus on a display in the condition in which the user grasps the grip section (see, for example, JP-A-2003-288154).

SUMMARY OF THE INVENTION

However, in the information processing device of the related art described above, the grip section is formed as a flat plate, and has a problem that in the condition in which the user grasps the grip, the grip section does not fit comfortably in the hand to make it difficult to assure preferable grasping property.

Further, in the information processing devices superior in portability, it is required to assure preferable operability to the operation section in the condition in which the user grasps the grip section.

Therefore, it may be desirable for information processing devices to solve the problem described above and to achieve improvement in the grasping property and the operability.

According to an embodiment of the invention, there is provided an information processing device which may include a device main body including a keyboard, and a display slidably supported by the device main body, wherein the device main body may include a support section for slidably supporting the display, and a pair of grip sections positioned on both sides of the display continuously to the support section and to be grasped by the user, the pair of grip sections is formed so as to protrude in a display arrangement direction in which the display is arranged with respect to the support section, and an operation section to be operated by the user is disposed on a surface of the pair of grip sections in the direction of protrusion.

Accordingly, in the information processing device of the embodiment of the invention, the operation to the operation section may be possible in the condition of grasping the pair of grip sections with both hands.

According to another embodiment of the invention, there is provided an information processing device which may include a device main body including a keyboard, and a display slidably supported by the device main body, wherein the device main body may include a support section for slidably supporting the display, and a pair of grip sections positioned on both sides of the display continuously to the support section and to be grasped by the user, the pair of grip sections may be formed so as to protrude in a display arrangement direction in which the display is arranged with respect to the support section, and an operation section to be operated by the user may be disposed on a surface of the pair of grip sections in the direction of protrusion.

Accordingly, in the condition in which the user grasps the grip sections, the grip sections may fit comfortably in the hands, thus the preferable grasping property can be assured.

Further, it may be possible to move the fingers to operate the operation section while grasping the grip sections, thus the preferable operability can be assured.

According to another embodiment of the invention, the keyboard may be provided to the support section, and the key board may be arranged to be opened or closed in accordance with the sliding operation of the display, thus the keyboard can be protected when not in use, and at the same time, the keyboard can be exposed to be used only if necessary.

According to another embodiment of the invention, since the outer peripheral surface of the pair of grip sections may be formed to be a curved surface, the contact area of the hand with the grip section may become large, thus the preferable grasping property can be assured.

According to still another embodiment of the invention, since a pair of protruding sections distant from each other in a direction along which the pair of grip sections may be arranged and protruding towards an opposing direction to the display arrangement direction with respect to the support section may be disposed on an opposing surface of the device main body to the surface supporting the display, the information processing device may easily be held, thus it may become possible to assure the preferable grasping property and to achieve preventing the information processing device from dropping.

According to another embodiment of the invention, since at least a part of the protruding sections may be composed of a battery, there may be no need for providing a dedicated protruding section to the device main body, thus the simplification of the structure can be achieved.

According to another embodiment of the invention, since a camera section may be disposed on a surface of the display facing the support section, and the camera section may be arranged to be opened or closed in accordance with the sliding operation of the display, the camera section may be protected when not in use, and at the same time, the camera section may be exposed to be used only if necessary.

DETAILED DESCRIPTION

Hereinafter, the information processing device according to an embodiment of the invention will be explained with reference to the accompanying drawings. One of the best modes described below applies the information processing device according to the embodiment of the invention to a personal computer.

It should be noted that the range of application of the information processing device according to the embodiment of the invention is not limited to the personal computer, but the information processing device according to the embodiment of the invention can be applied widely to various information processing devices such as personal digital assistants (PDA), network terminals, handheld terminals, workstations.

Figure 1:
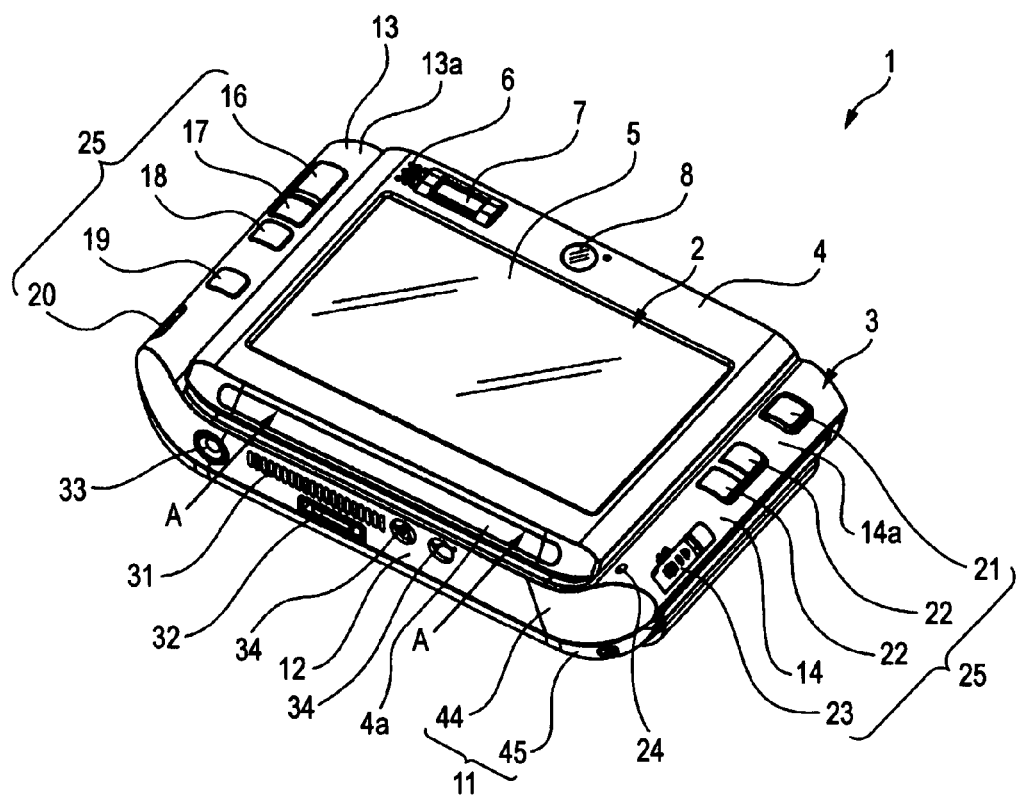
FIG. 1, together with FIGS. 2 through 16, shows an embodiment of the present invention, and is a perspective view of an information processing device showing the condition in which a keyboard is closed.

The information processing device (the personal computer) 1 is provided with a display 2 and a device main body 3 (see FIG. 1).

The display 2 is held by the device main body 3 slidably in the vertical direction (see FIGS. 1 and 2), and is provided with a display chassis 4 formed to have a horizontally long, flat, and substantially rectangular shape and a display panel 5 assembled with the display chassis 4.

On the upper end of the front face of the display chassis 4, there are provided speaker perforations 6, a fingerprint sensor 7, and a front camera section 8 horizontally distant from each other.

The speaker perforations 6 are holes for outputting sound from a speaker not shown disposed inside the display chassis 4.

The fingerprint sensor 7 is a sensor for reading the registered fingerprint information. By using the fingerprint sensor 7, input of the password, the account, and so on can be substituted with the fingerprint.

The front camera section 8 mainly functions as a camera for shooting the user itself of the information processing device 1. It is useful for the usage as a picture phone to shoot the user itself with the front camera 8.

Figure 3:
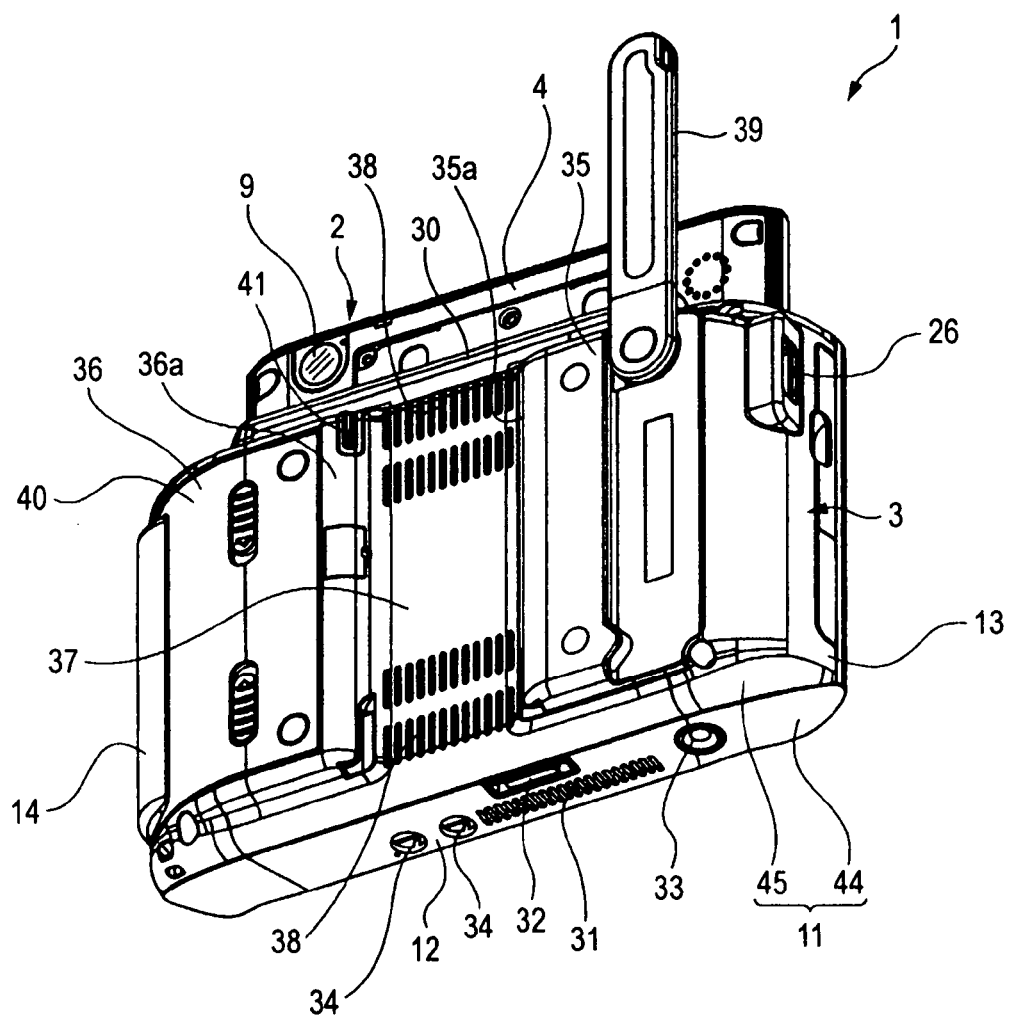
FIG. 3 is a perspective view showing the back face side of the information processing device in the condition in which a display is made protrude from the device main body and a first antenna is pulled out.

On the back face of the display chassis 4, there is disposed a camera section 9 (see FIG. 3). The camera section 9 is exposed in the condition in which the display 2 is moved upward so that a part thereof protrudes upward from the device main body 3, and closed in the condition in which the display 2 is moved downward so as not to protrude from the device main body 3 (see FIGS. 3 and 4). The camera section 9 mainly functions as a camera for shooting other subjects than the user.

By configuring so as to open and close the camera section 9 in accordance with the sliding operation of the display 2 as described above, the camera section 9 can be protected when the camera section 9 is not in use, and at the same time, the camera section 9 can be used in the exposed condition only if necessary.

Figure 5:
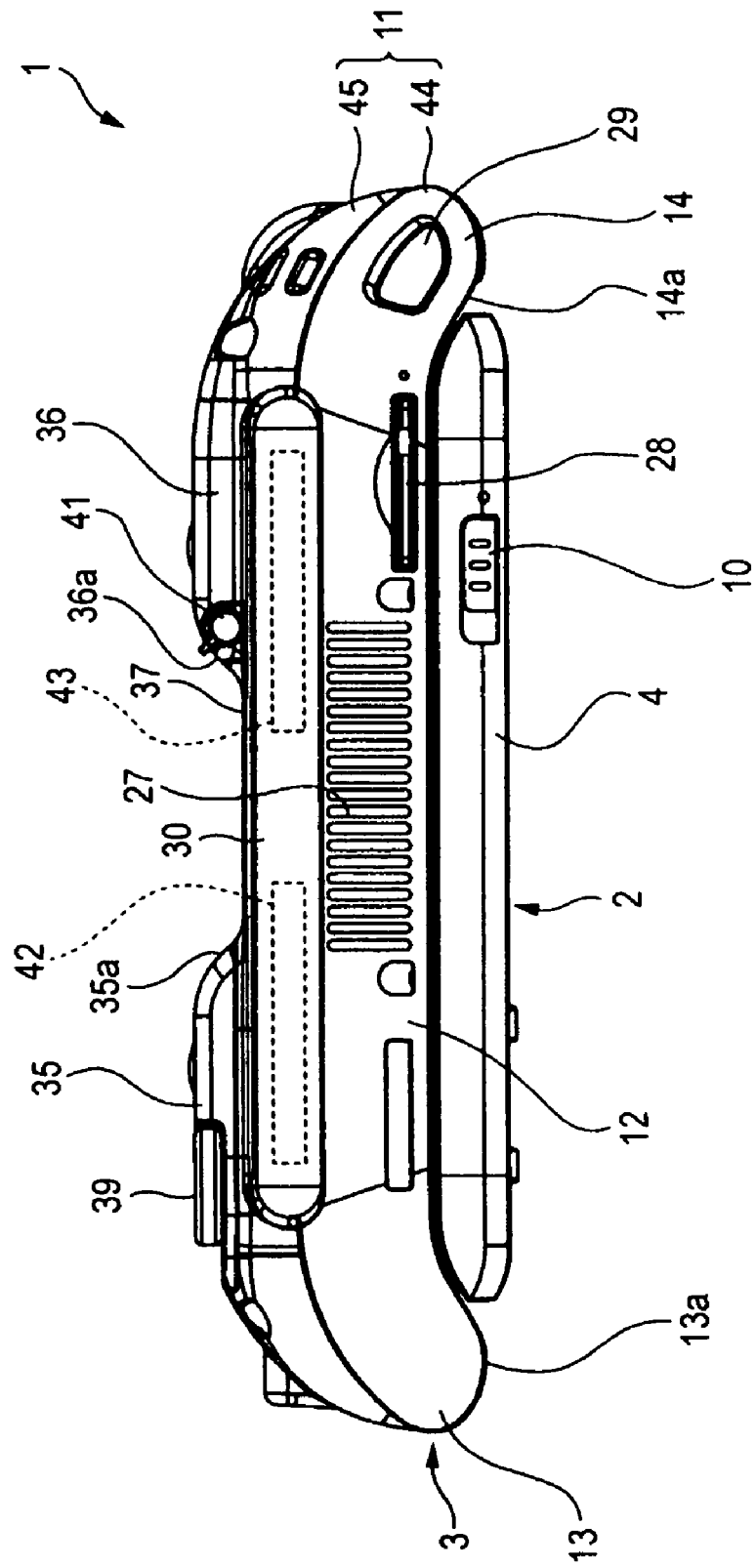
FIG. 5 is a plan view of the information processing device.

On the upper face of the display chassis 4, there is disposed a focus switching switch 10 (see FIG. 5). By operating the focus switching switch 10, switching of a focus mode in the camera section 9 can be performed.

Figure 6:
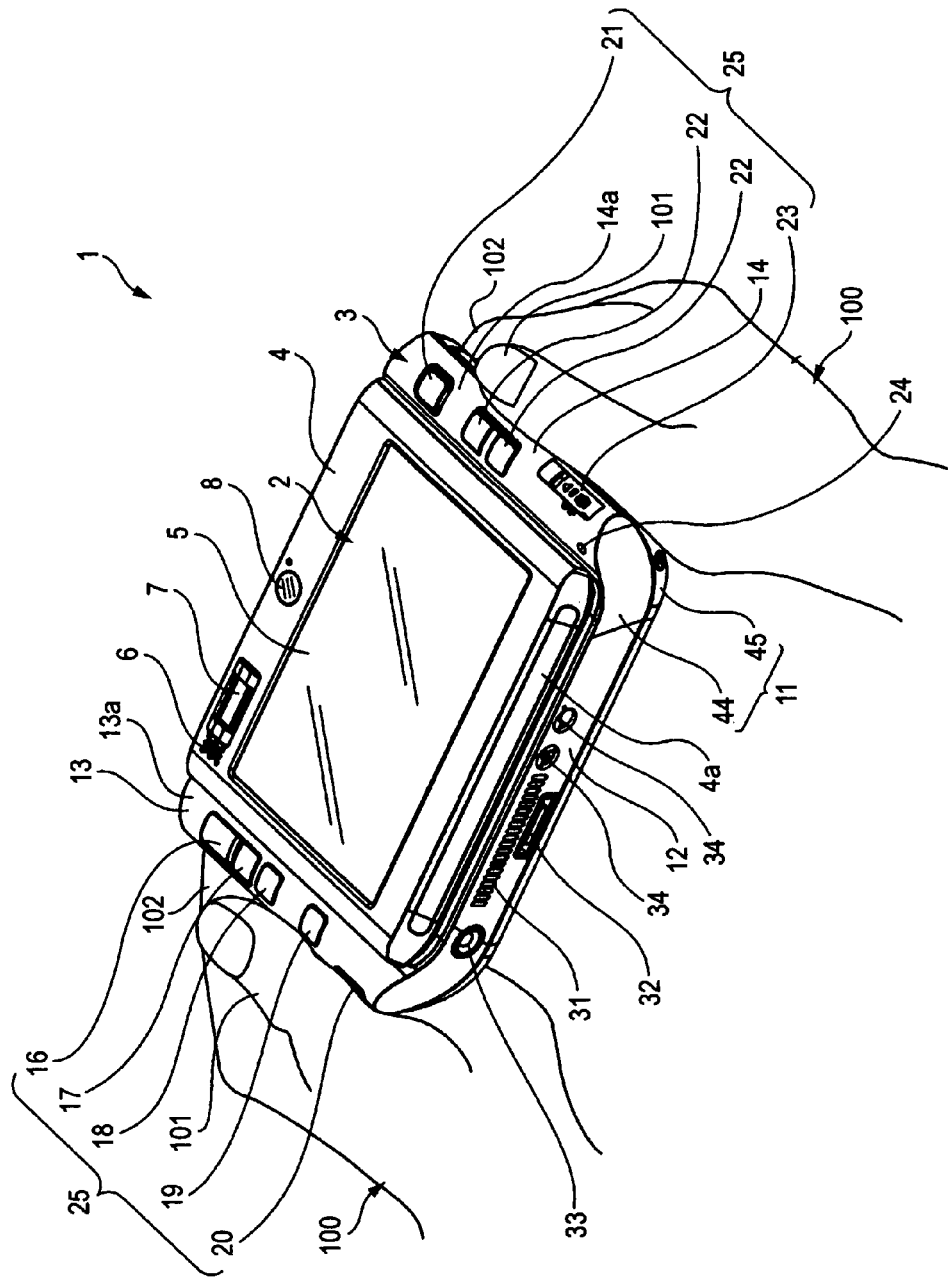
FIG. 6 is a perspective view showing the condition in which the information processing device is grasped with the both hands.

The bottom face of the display chassis 4 is formed to have an inclined plane 4a inclined so that the upward displacement at a certain position becomes greater while the position moves towards the front side. By forming the inclined plane 4a as described above, the display 2 can easily be slid upward with respect to the device main body 3 by attaching the thumbs 101 to the inclined plane 4a in the condition in which the device main body 3 is grasped by the both hands 100 as shown in FIG. 6 (see the arrow A in FIG. 1).

Figure 2:
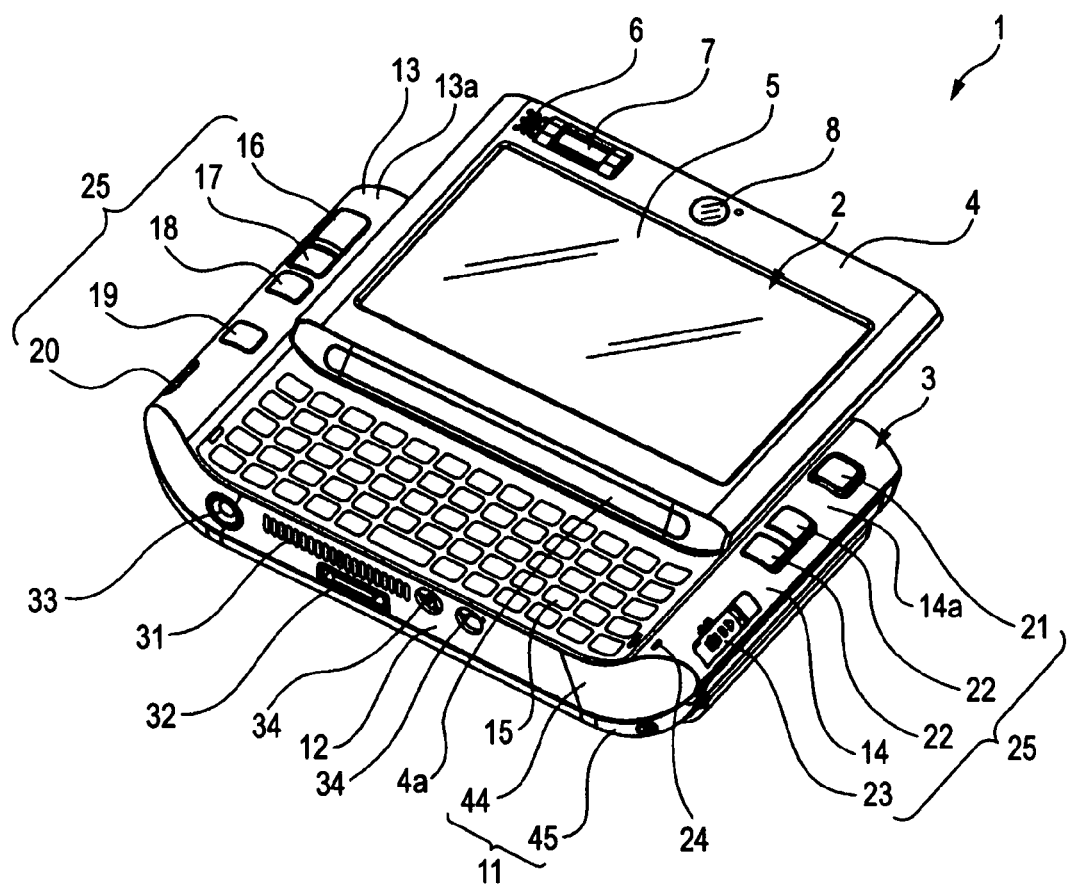
FIG. 2 is a perspective view of the information processing device showing the condition in which the keyboard is opened.

The device main body 3 is provided with necessary sections disposed on or attached to inside or outside of the outside chassis 11 (see FIGS. 1 and 2). The outside chassis 11 is formed of so called carbon fibers made of a carbon material as a base material with metal fibers included therein.

The device main body 3 is provided with a portion excluding the both ends in the horizontal directions as a support section 12 formed to have a horizontally long, and substantially rectangular shape, and the portions thereof on the both horizontal sides of the support section 12 as grip sections 13, 14, respectively.

On the lower half portion in the front of the support section 12, there is provided a keyboard 15 having a plurality of operation keys (see FIG. 2). The keyboard 15 is exposed in the condition in which the display 2 is moved upward so that a part thereof protrudes upward from the device main body 3, and closed in the condition in which the display 2 is moved downward so as not to protrude from the device main body 3 (see FIGS. 1 and 2).

By configuring so as to open and close the keyboard 15 in accordance with the sliding operation of the display 2 as described above, the keyboard 15 can be protected when the keyboard 15 is not in use, and at the same time, the keyboard 15 can be used in the exposed condition only if necessary.

The grip section 13 protrudes diagonally upward left from the left end of the support section 12. The surfaces of the grip section 13 other than both of the top and bottom surfaces thereof are formed as an outward convex curved surface 13a and connected to the front face and the back face of the support section 12.

On the grip section 13, there are disposed a left button 16, a right button 17, a center button 18, and an operation button 19 each facing to the front and in this order from the upper side. The left button 16, the right button 17, and the center button 18 are buttons respectively correspond to the left button, the right button, and the center wheel provided to a mouse device. The operation button 19 is a button for executing predetermined software.

In the lower end portion of the grip section 13, there is disposed a communication function execution switch 20. By operating the communication function execution switch 20, an execution and an abort of the communication function can be performed.

The grip section 14 protrudes diagonally upward right from the right end of the support section 12. The surfaces of the grip section 14 other than both of the top and bottom surfaces thereof are formed as an outward convex curved surface 14a and connected to the front face and the back face of the support section 12.

On the grip section 14, there are disposed a stick pointer 21 and zoom buttons 22 each facing to the front and in this order from the upper side. The stick pointer 21 has a function of the mouse device for moving a pointer on the display panel 5. The zoom buttons 22 are buttons having a function of zooming images shot by the front camera section 8 and the camera section 9.

In the lower end section of the grip section 14, there are provided a power switch 23 and a microphone hole 24. The microphone hole 24 is hole for inputting sound to a microphone not shown disposed inside the outside chassis 11.

The left button 16, the right button 17, the center button 18, the operation button 19, the communication function execution switch 20 disposed on the grip section 13, and the stick pointer 21, the zoom buttons 22, and the power switch 23 disposed on the grip section 13, 14 function as the operation section 25 which can be operated by the user in the condition in which the user grasps the grip sections 13, 14 by the both hands 100.

Since the grip sections 13, 14 each protrude from the support section 12 towards the display 2 as described above, the display 2 is in a condition of being covered by the grip sections 13, 14 from the both sides thereof (see FIG. 5).

Figure 4:
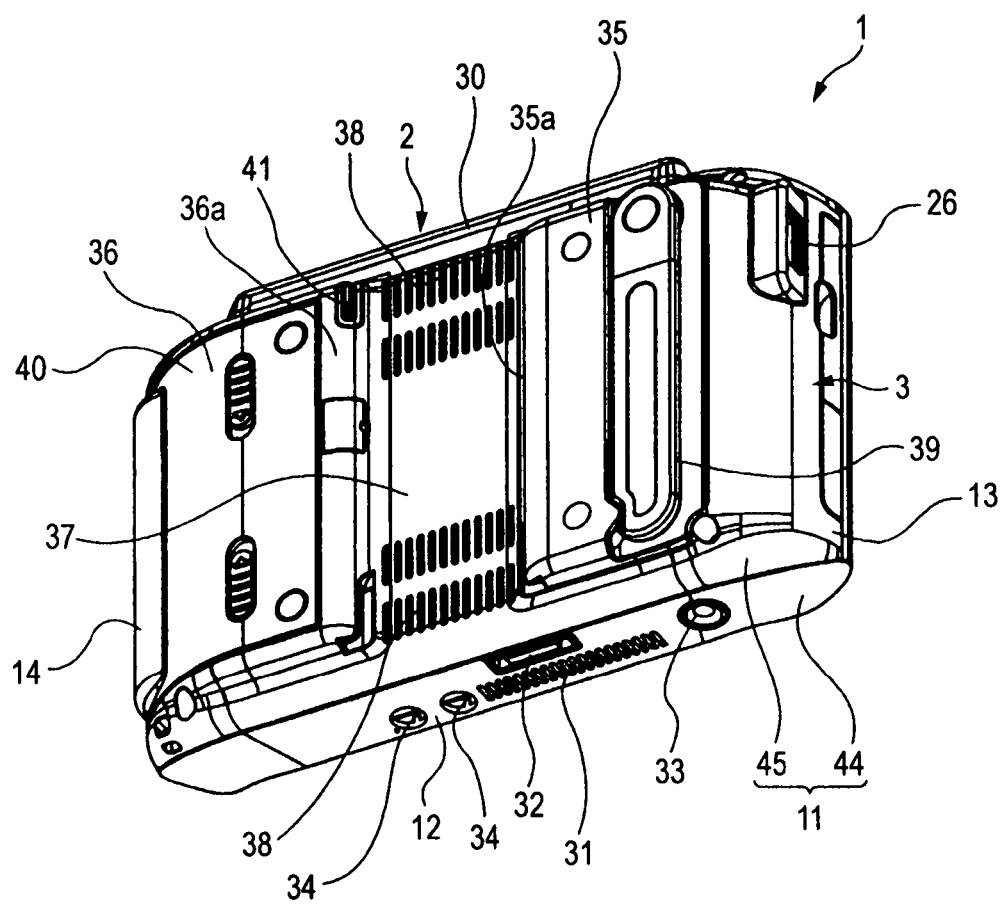
FIG. 4 is a perspective view showing the back face side of the information processing device.

On the left side of the device main body 3, there is provided a connector terminal 26 such as an universal serial bus (USB) terminal (see FIGS. 3 and 4).

On the upper surface of the device main body 3, there are provided exhaust holes 27, an medium slot 28, and a shooting button 29 (see FIG. 5).

The exhaust holes 27 are disposed at substantially the central part of the device main body 3 in the horizontal direction, and have a function of discharging the cooling air raised in temperature inside the outer chassis 11 to the outside.

To the media slot 28, a card type storage medium, for example, is threaded.

The shooting button 29 is positioned at the right end thereof, and is a button to be operated by pressurizing when shooting a still image or a moving image by the front camera section 8 and the camera section 9.

On the upper surface of the device main body 3, there are mounted two antennas described later horizontally distant from each other, and the two antennas are covered with an antenna cover 30.

On the bottom surface of the device main body 3, there are provided air inlets 31, an external connector 32, a power connector 33, connection connectors 34 (see FIGS. 1 through 4).

The air inlets 31 have a function of taking in the cooling air inside the outer chassis 11 from the outside.

The external connector 32 is a connector for performing connection with an external device such as an external display or a liquid crystal projector.

The power connector 33 is provided with a power cord for the commercial power supply connected thereto.

The connection connectors 34 are connectors for connecting thereto various devices such as an external speaker, a headphone, or a microphone.

On the back face of the device main body 3, there are provided protruding sections 35, 36 horizontally distant from each other (see FIGS. 3 through 5). The protruding sections 35, 36 are formed to have a flat shape with a small thickness, to have a vertical width a little bit smaller than the vertical width of the device main body 3, and so as to be connected to the left side surface and the right side surface of the device main body 3, respectively. The back face of each of the protruding sections 35, 36 is formed planar.

By providing the protruding sections 35, 36 to the device main body 3, the portion between the protruding sections 35, 36 is formed as a shallowly recessed section 37. The recessed section 37 is provided with plural sets of air inlets 38 formed vertically distant from each other (see FIGS. 3 and 4). The sets of air inlets 38 have the function of taking in the cooling air inside the outer chassis 11 from the outside similarly to the air inlets 31 described above.

At the right end portion of the protruding section 35, there is formed a step surface 35a formed to have an inclined shape inclined so that the displacement towards the front at a certain position becomes greater while the position moves right.

The protruding section 35 is provided with a first antenna 39 pivotally supported thereon (see FIGS. 3 through 5). The first antenna 39 is provided pivotally around the upper end portion of the protruding section 35 as a pivot, and the entire first antenna 39 is positioned in accordance with the protruding section 35 (see FIG. 4) when not in use, or the first antenna 39 is pivoted when in use and is used in the condition of protruding upward from the device main body 3 (see FIG. 3). The first antenna 39 is an antenna compliant, for example, to One-segment (1SEG) as one of terrestrial digital television broadcasting services or a wide area network (WAN) formed by connecting local area networks (LAN) in distant areas to each other via dedicated lines.

At the left end portion of the protruding section 36, there is formed a step surface 36a formed to have an inclined shape inclined so that the displacement towards the front at a certain position becomes greater while the position moves left.

Figure 7:
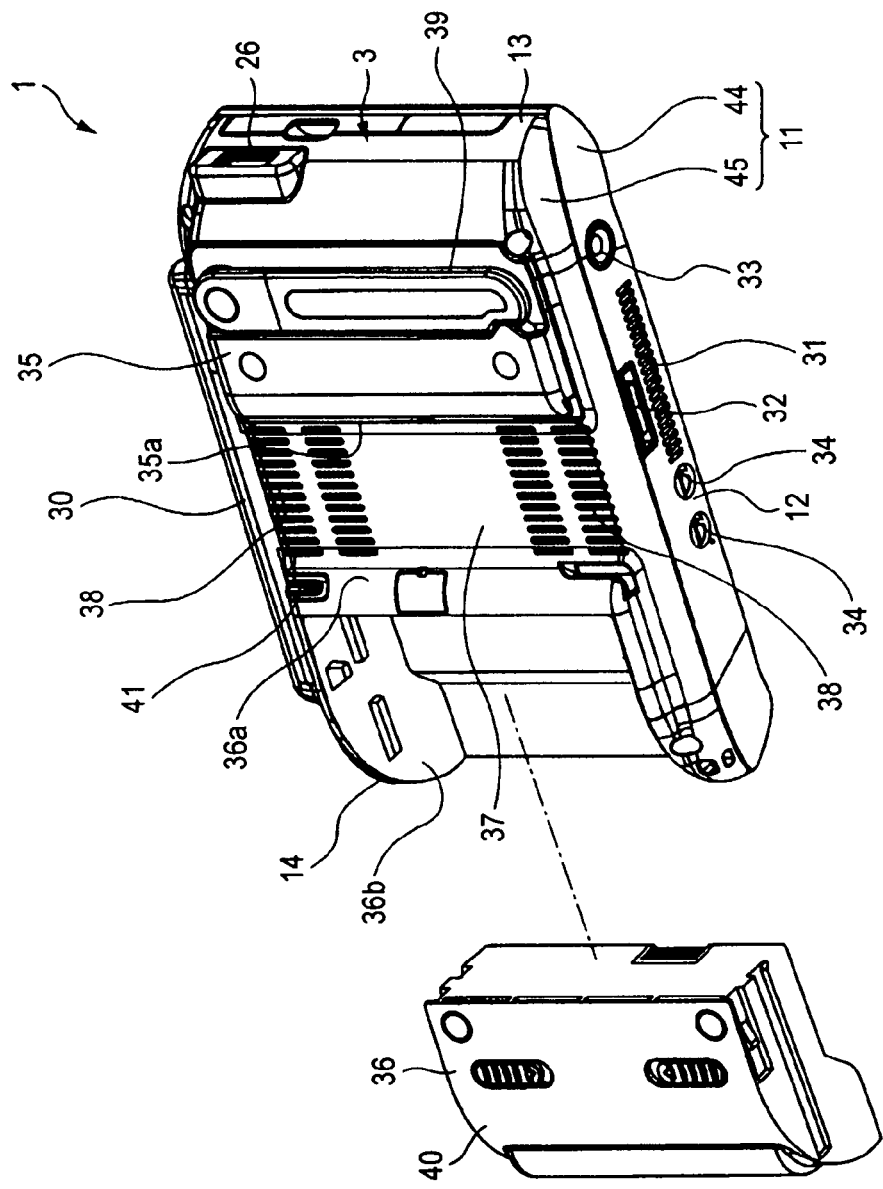
FIG. 7 is a perspective view of the information processing device showing the condition in which a battery is detached therefrom.

The protruding section 36 is provided with a battery mounting recessed section 36b opening backward and rightward (see FIG. 7). The battery mounting recessed section 36b is provided with a battery 40 mounted thereon. Therefore, the protruding section 36 is composed by mounting the battery 40 on the battery mounting recessed section 36b.

Since the first antenna 39 is pivoted when in use, and is used in the condition of protruding upward from the device main body 3 as described above, it is possible to achieve further downsizing of the information processing device 1 when the first antenna 39 is not in use.

Further, since the first antenna 39 is required to be pivoted with respect to the device main body 3 to protrude upward from the device main body 3 only when the first antenna 39 is used, enhancement of the usability thereof can be achieved.

The protruding section 36 is provided with a pen storage section not shown formed on the end portion thereof on the protruding section 35 side so as to open upward. The pen storage section stores an input pen 41 (see FIGS. 3 through 5).

In the information processing device 1, the grip sections 13, 14 are provided as described above, and when the user uses the information processing device 1 as a portable device, the user grasps the grip sections 13, 14 respectively with the both hands 100 to perform various operations as shown in FIG. 6.

In this using condition, since the grip sections 13, 14 are positioned laterally to the display 2, the both hands 100 grasping the grip sections 13, 14 is prevented from covering the display 2, thus enhancement of usability can be achieved.

Further, in the information processing device 1, since the pair of grip sections 13, 14 protrudes from the support section 12 towards the front side, in the condition in which the user grasps the grip sections 13, 14, the grip sections 13, 14 fit comfortably in the hands, thus making it possible to assure the preferable grasping property.

Figure 8:
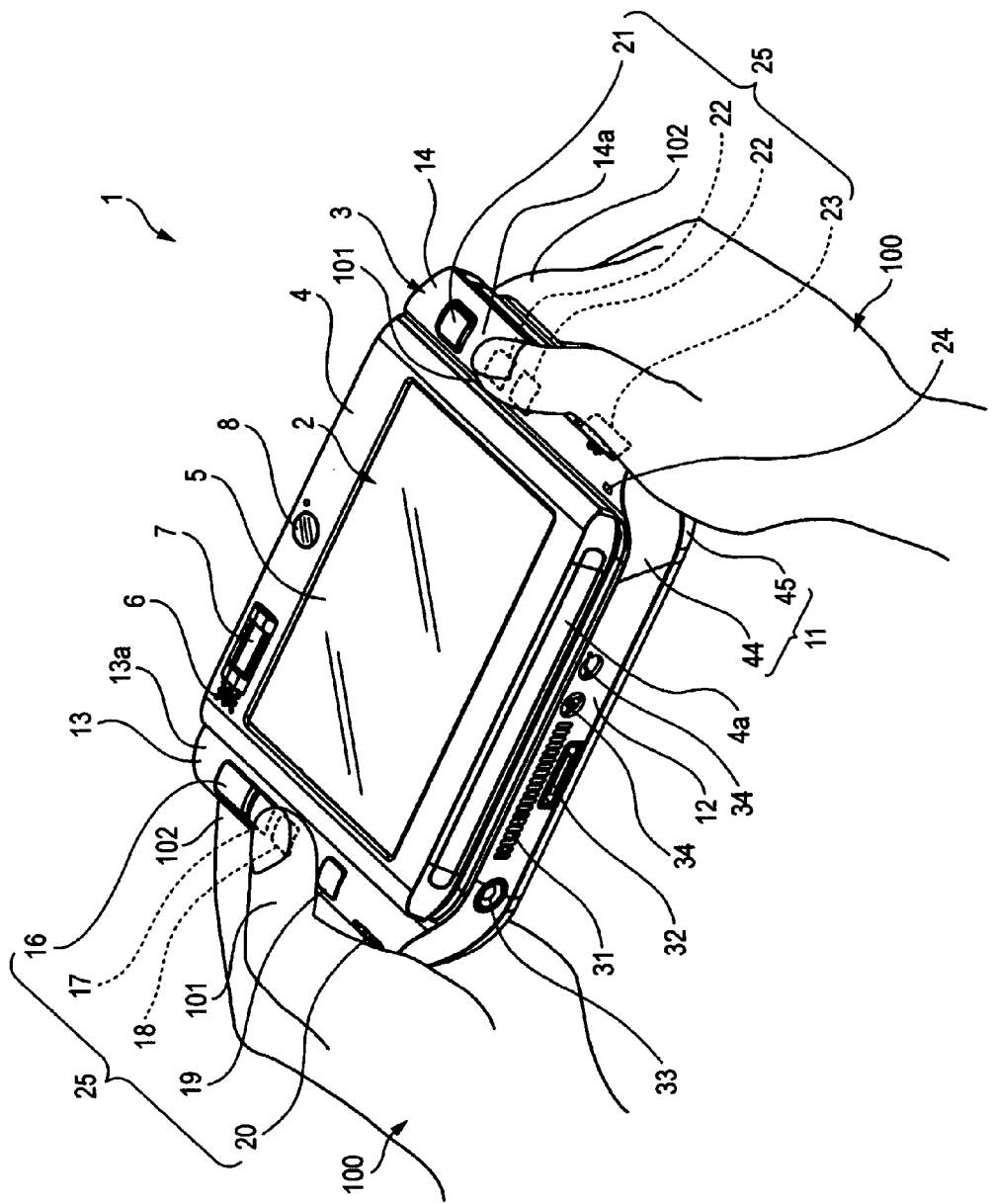
FIG. 8 is a perspective view of the information processing device showing the condition in which an operation section is being operated.

Further, since the grip sections 13, 14 are provided with the operation section 25, it is possible to move the fingers, while grasping the grip sections 13, 14, to operate the operation section 25 (see FIG. 8), thus making it possible to assure the preferable operability.

In addition, since the outer periphery surfaces of the grip sections 13, 14 are formed as the curved surfaces 13a, 14a so as to fit the shape of the hands, the contact area of the hands with the grip sections 13, 14 are large, thus the preferable grasping property can be assured.

Figure 9:
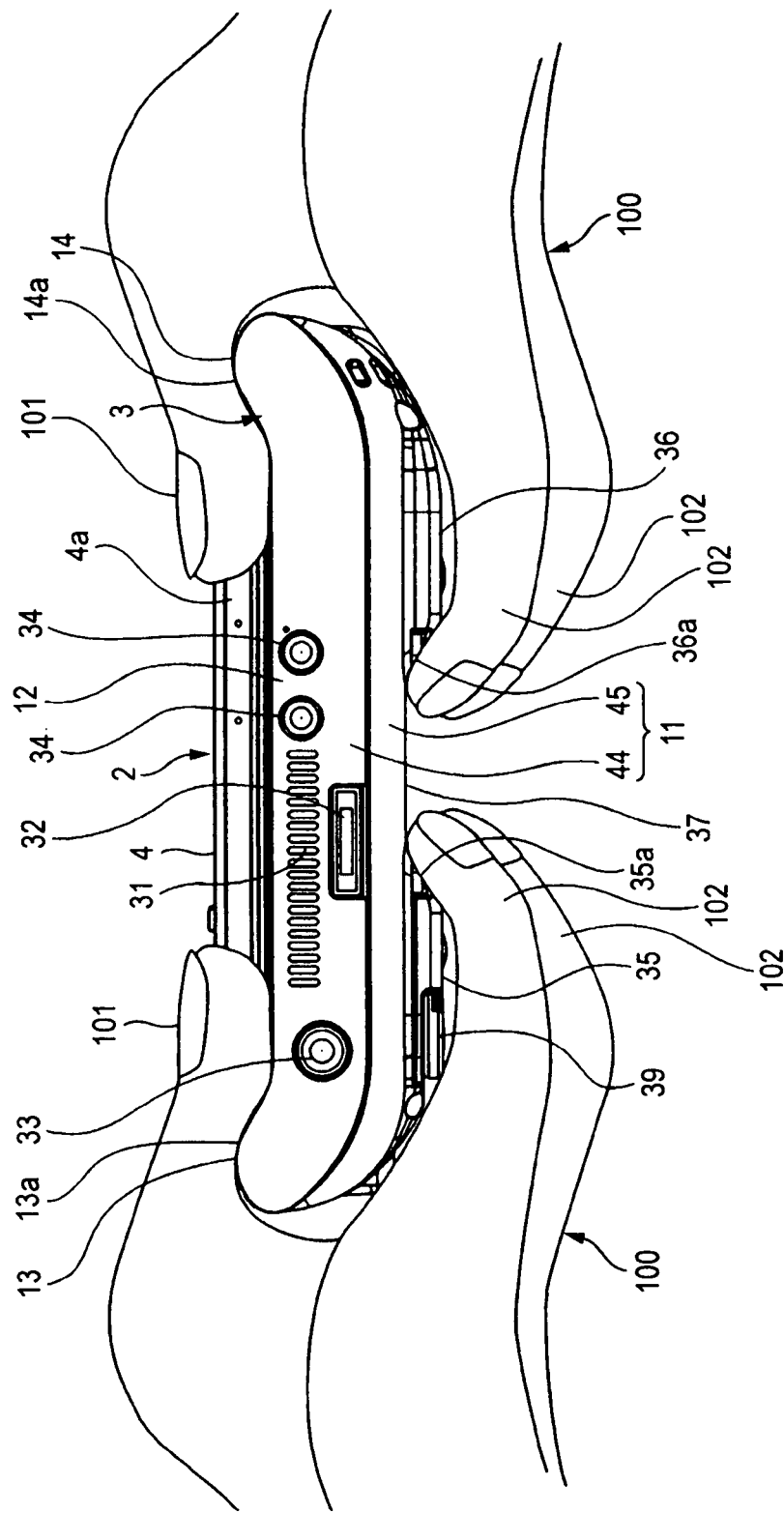
FIG. 9 is a bottom view showing the condition in which the information processing device is grasped with the both hands.

In the condition in which the user grasps the grip sections 13, 14 with the hands 100, the fingers 102 other than the thumbs 101 are attached to the back face of the device main body 3 (see FIG. 9). The device main body 3 is provided with the protruding sections 35, 36, the tip sections of the fingers 102 are respectively attached to the step surfaces 35a, 36a positioned at the ends of the protruding sections 35, 36 on the support section 12 side (see FIG. 9). Therefore, it is easy to hold the information processing device 1, thus assuring the preferable grasping property, thereby achieving to prevent the information processing device 1 from dropping.

Further, since the protruding section 36 is composed of the battery 40, there is no need for providing a dedicated protruding section to the device main body 3, and thus the simplification of the structure can be achieved.

It should be noted that although the example of configuring the protruding section 36 with the battery 40 is described above, it is possible to configure the protruding section 35 with the battery, on the contrary, or it is also possible to configure both of the protruding sections 35, 36 with a pair of batteries.

In the condition in which the user grasps the grip sections 13, 14 with the both hands 100, since the both hands 100 do not contact both of the upper and the bottom surfaces of the device main body 3 and the recessed section 37 formed on the back side of the device main body 3, the both hands 100 are prevented from covering the exhaust holes 27 formed on the upper surface of the device main body 3, the air inlets 31 provided to the lower surface of the device main body 3, and the air inlets 38 formed in the recessed section 37, thus making it possible to assure preferable heat radiation property in the information processing device 1.

Figure 10:
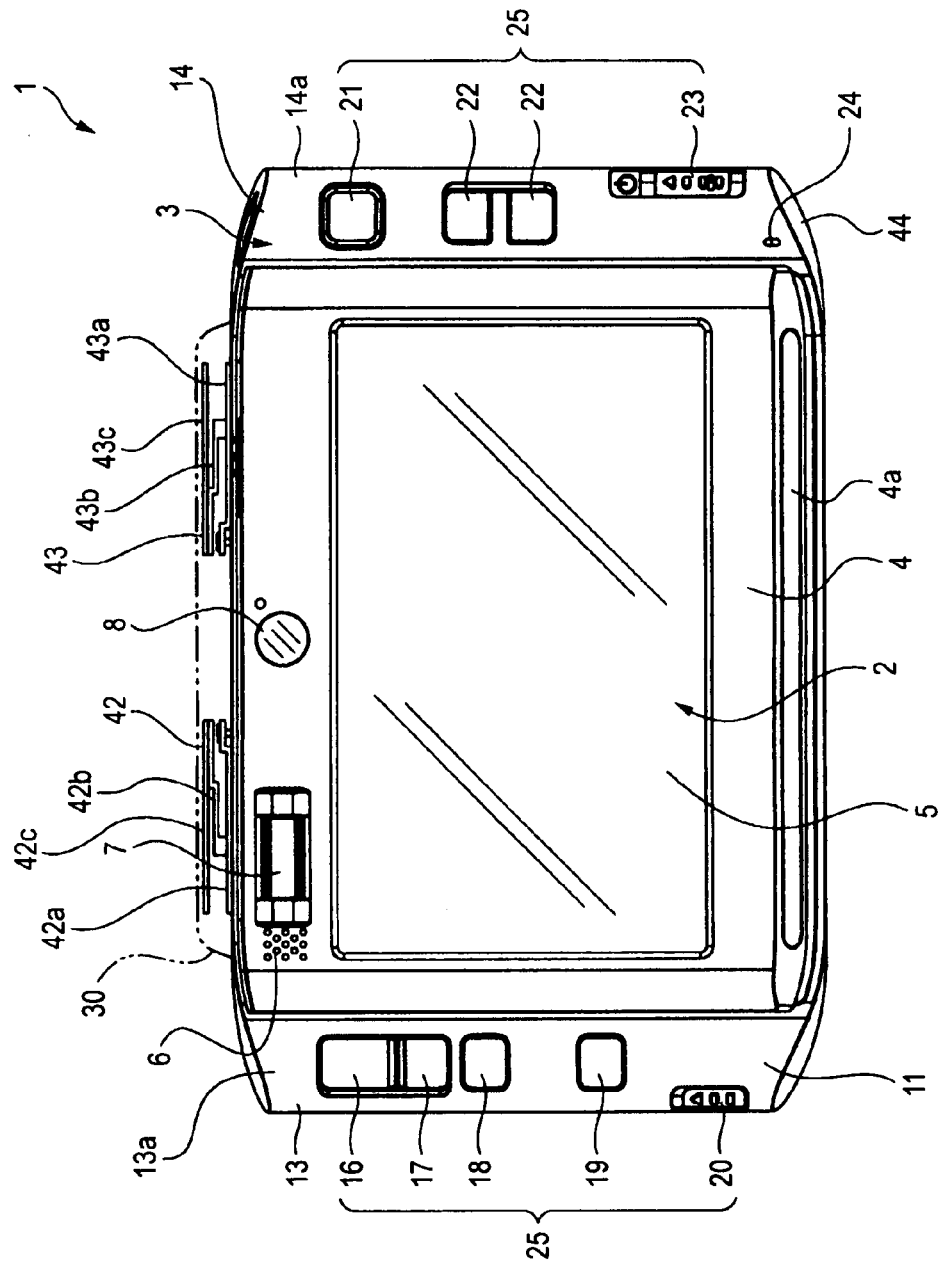
FIG. 10 is a front elevation view of the information processing device with an antenna cover detached therefrom.

On the upper surface of the device main body 3, there are attached a second antenna 42 and a third antenna 43 horizontally distant from each other by, for example, screw cramping (see FIG. 10).

The second antenna 42 and the third antenna 43 are antennas with a different communication standard from the first antenna 39, and the second antenna 42 is an antenna for, for example, a wireless local area network (LAN), and the third antenna 43 is an antenna for, for example, the bluetooth using an electromagnetic wave of 2.4 GHz band.

It should be noted that although the different kinds of communication standards are described above as an example of the second antenna 42 and the third antenna 43, the antennas with the same communication standards, for example, can be used as the second antenna 42 and the third antenna 43.

The second antenna 42 is provided with a grounding section 42a extending horizontally, a linking section 42b protruding upward from the grounding section 42a, and a radiation section 42c horizontally protruding from the upper end portion of the linking section 42b and in parallel with the grounding section 42a. The second antenna 42 is attached in the condition in which the grounding section 42a has a surface contact with the upper surface of the outer chassis 11 to define the left end of the radiation section 42c as the radiation end.

The third antenna 43 is provided with a grounding section 43a extending horizontally, a linking section 43b protruding upward from the grounding section 43a, and a radiation section 43c horizontally protruding from the upper end portion of the linking section 43b and in parallel with the grounding section 43a. The third antenna 43 is attached in the condition in which the grounding section 43a has a surface contact with the upper surface of the outer chassis 11 to define the right end of the radiation section 43c as the radiation end.

As described above, in the information processing device 1, since the grounding sections 42a, 43a of the second antenna 42 and the third antenna 43 are attached to the outer chassis 11 formed of carbon fiber, and the outer chassis 11 is used as the ground for the second antenna 42 and the third antenna 43, the ground area becomes large, and accordingly, downsizing of the second antenna 42 and the third antenna 43 can be achieved in the condition of maintaining the preferable characteristics of the second antenna 42 and the third antenna 43.

Further, since the outer chassis 11 is used as the ground, there is no need for providing the dedicated ground for the second antenna 42 and the third antenna 43 as a separate component, thus the simplification of the structure and the reduction of the number of components can be achieved.

Further, since the second antenna 42 and the third antenna 43 are attached to other sections than the grip sections 13, 14, it is prevented that the second antenna 42 and the third antenna 43 are covered by the both hands 100 when the user grasps the grip sections 13, 14, thus the preferable characteristics of the second antenna 42 and the third antenna 43 can be maintained.

In addition, in the information processing device 1, the radiation end of the radiation section 42c of the second antenna 42 and the radiation end of the radiation section 43c of the third antenna 43 are each disposed at the outer end, and positioned greatly distant from each other. Therefore, the interference in the communication state between the second antenna 42 and the third antenna 43 can be suppressed.

Hereinafter, the inside structure of the information processing device 1 will be explained (see FIGS. 11 through 16).

Figure 11:
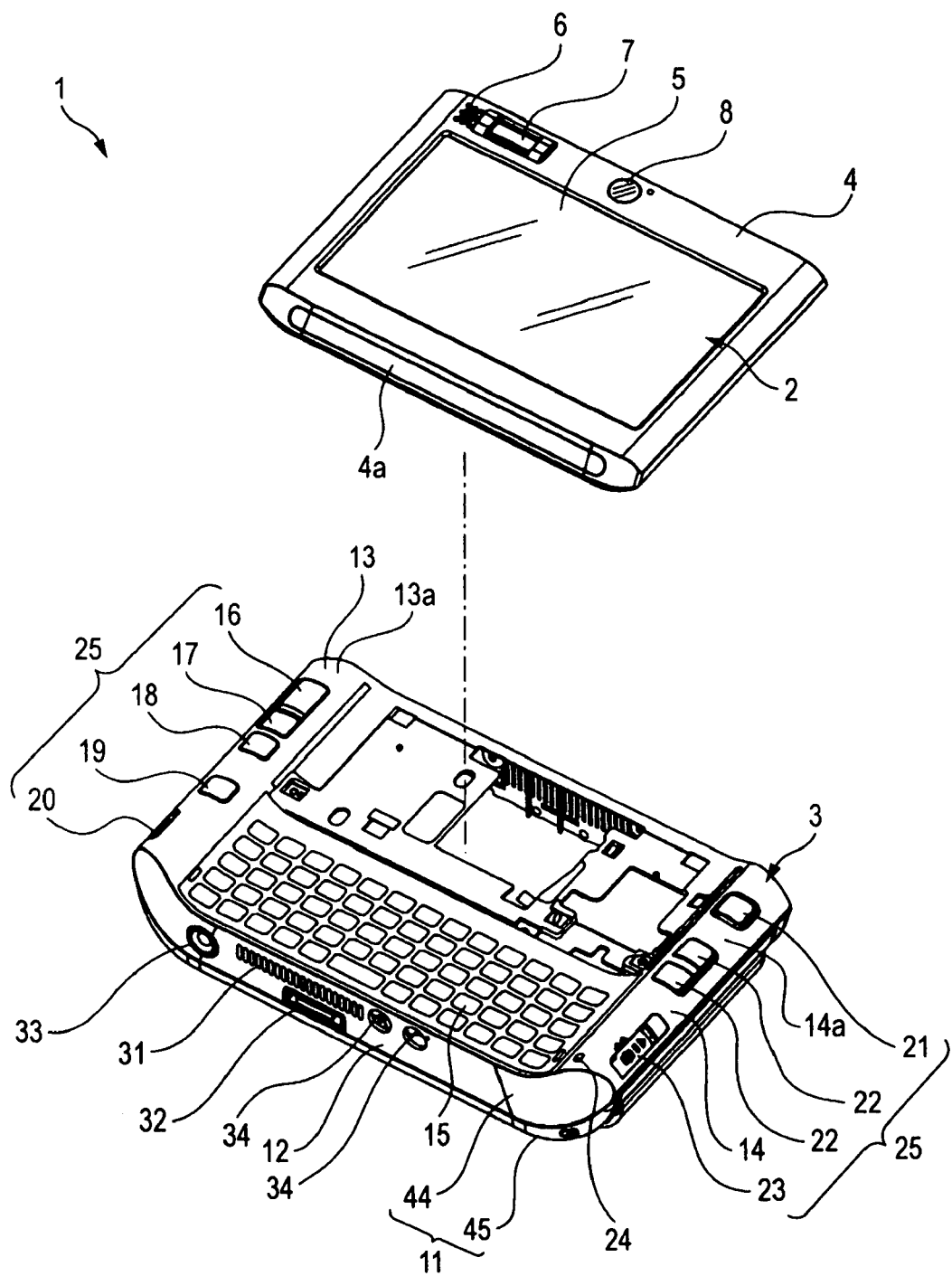
FIG. 11 is a perspective view of the information processing device showing a display and a device main body separately from each other.
Figure 12:
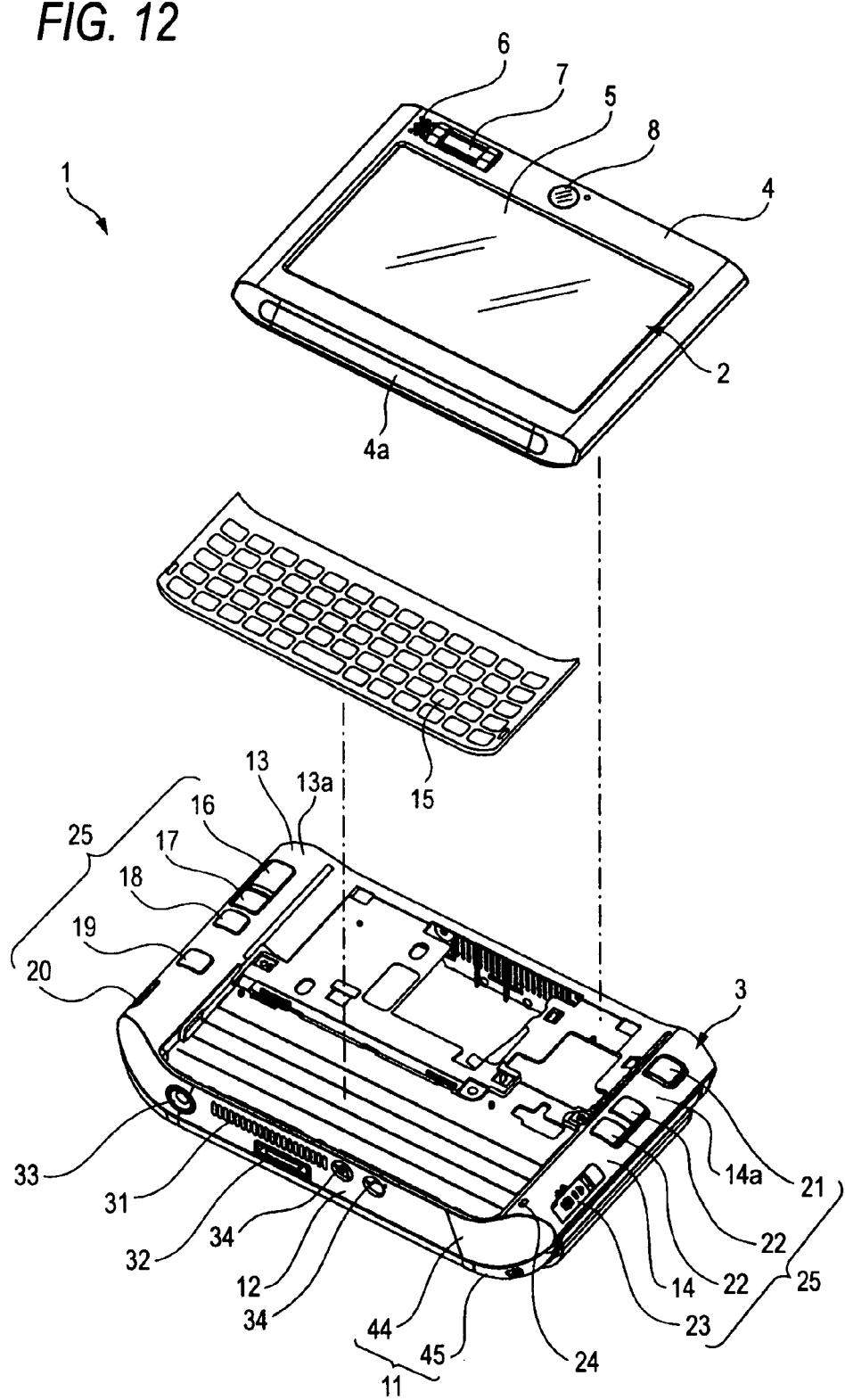
FIG. 12 is a perspective view of the information processing device showing the condition in which the keyboard and the display are separated therefrom.
Figure 13:
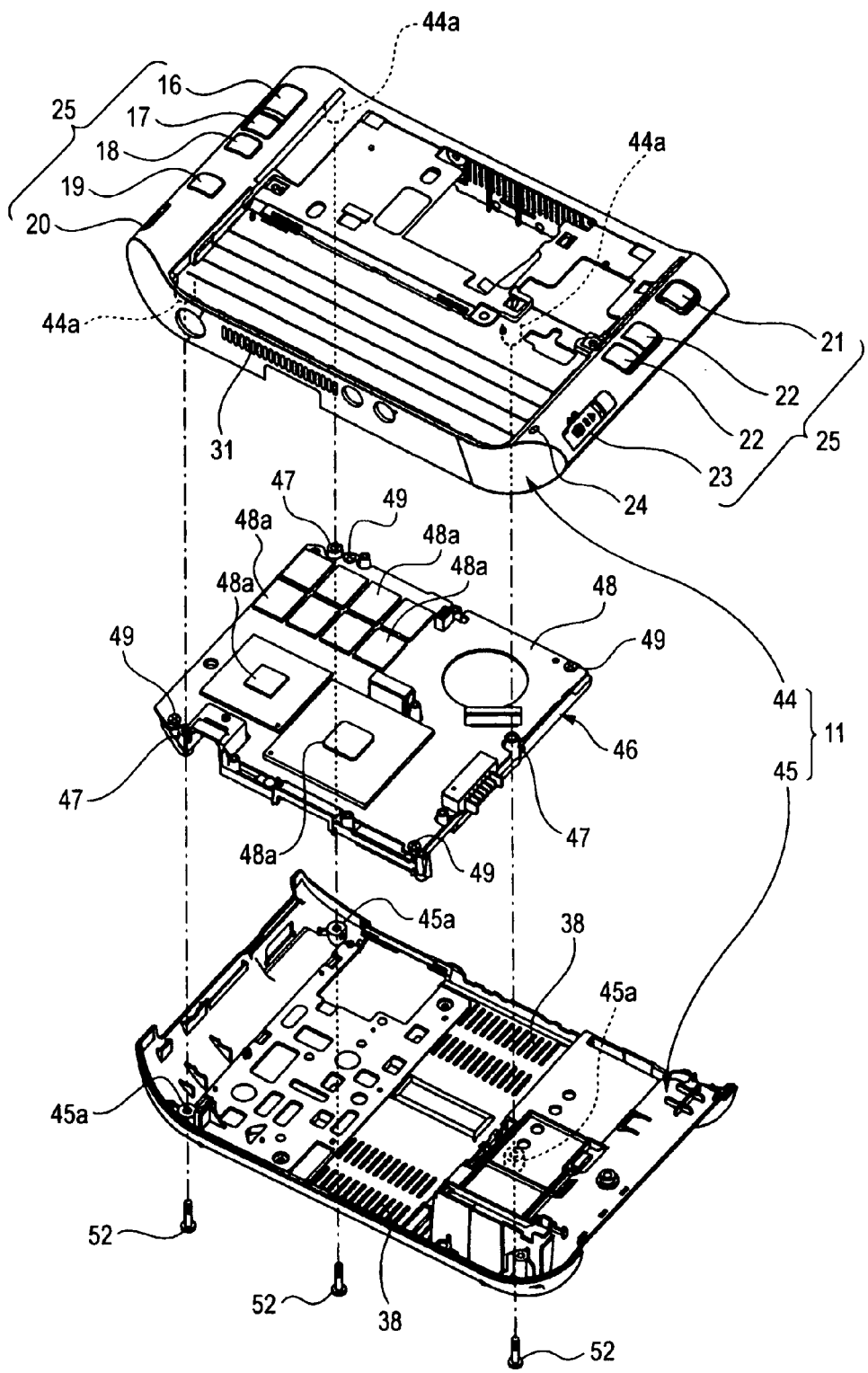
FIG. 13 is an exploded perspective view showing the inside structure.

The outer chassis 11 is composed a first case 44 and a second case 45 vertically combined to each other (see FIGS. 11 through 13).

The first case 44 is provided with mounting bosses 44a on the inside surface (lower surface) each having a screw hole opening downward (see FIG. 13).

The second case 45 is provided with mounting shafts 45a on the inside surface (upper surface) each having a through hole penetrating vertically.

Figure 14:
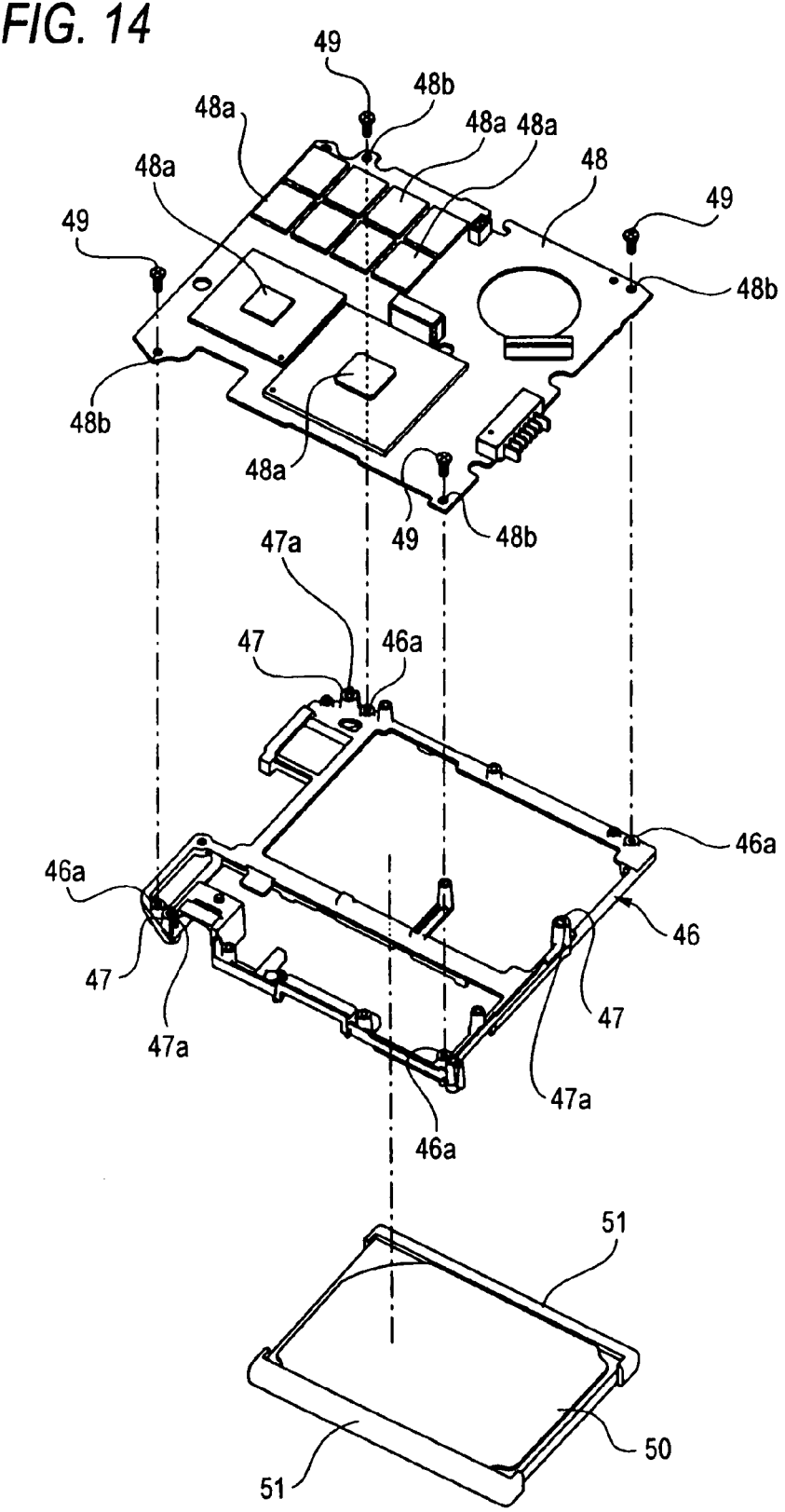
FIG. 14 is an exploded perspective view showing a metal frame, a circuit board, and a hard disk drive.
Figure 15:
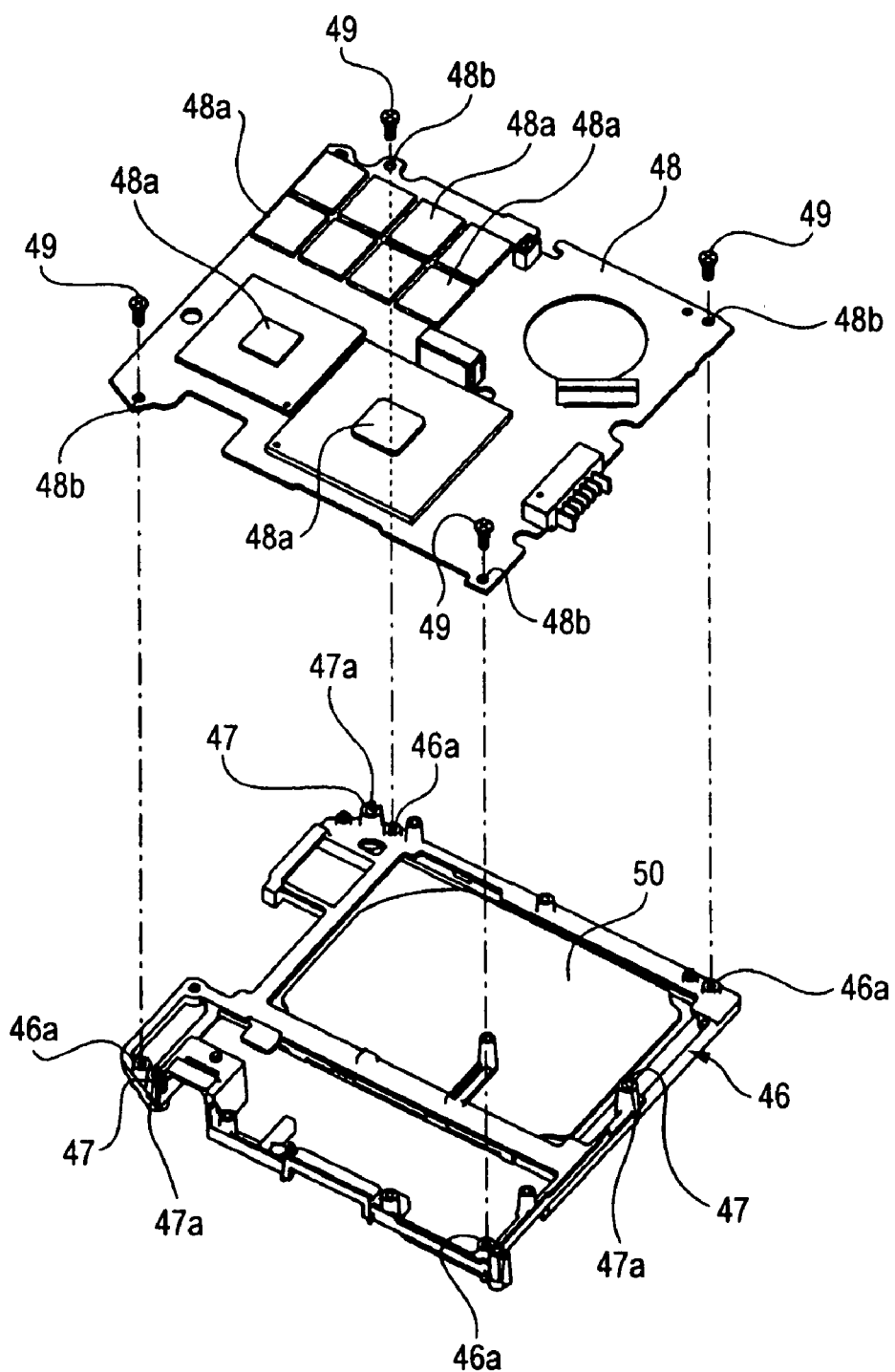
FIG. 15 is an exploded perspective view showing the metal frame and the circuit board.
Figure 16:
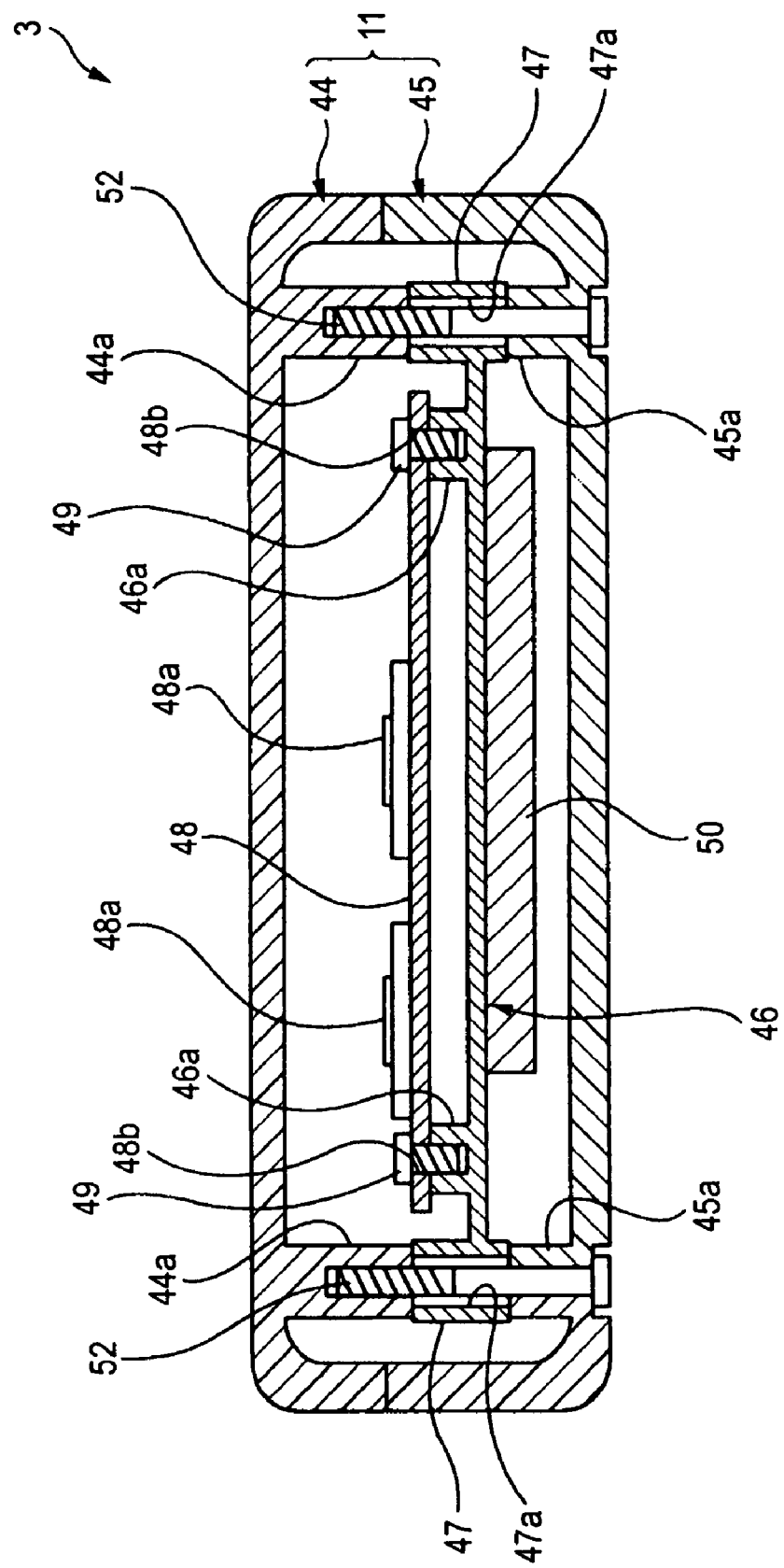
FIG. 16 is a schematic cross-sectional view showing the inside structure.

The outer chassis 11 is provided with a metal frame 46 fixed inside thereof (see FIGS. 13 through 15). The metal frame 46 is formed to have a small thickness, and a substantially rectangular outer shape, and is made, for example, of magnesium. It should be noted that the metal frame 46 can be made of other metal materials such as aluminum.

The metal frame 46 is provided with bosses 47, and each of the bosses is provided with a screw threading hole 47a vertically penetrated therethrough (see FIG. 14). The metal frame 46 is provided with board mounting bosses 46a at the four corners thereof each having a screw hole opening upward.

On the upper surface of the metal frame 46, there is fixed a circuit board 48 (see FIGS. 13 through 15). On the circuit board 48, there are mounted electronic components 48a, some of which become heat generator for generating heat when they are driven. The four corners of the circuit board 48 are each provided with a screw threading hole 48*b*.

The circuit board 48 is fixed to the metal frame 46 by screwing screw members 49 threaded in the screw threading holes 48*b* to the board mounting bosses 46*a* of the metal frame 46.

On the lower surface of the metal frame 46, there is fixed a hard disk drive 50 by, for example, screw cramping (see FIGS. 14 and 15). The hard disk drive 50 is fixed to the metal frame 46 with dumpers 51 attached to two side edges thereof.

The metal frame 46 is attached to the inside of the outer chassis 11 with fixing screws 52 with the circuit board 48 and the hard disk drive 50 attached thereto (see FIG. 13). The diameter of the shaft section of each of the fixing screws 52 is arranged to be smaller than the diameter of each of the screw threading holes 47*a* of the bosses 47 of the metal frame 46.

The fixing screws 52 are threaded through the mounting shafts 45*a* of the second case 45 and the bosses 47 of the metal frame 46 from bottom thereof, and screwed to the mounting bosses 44*a* of the first case 44. Therefore, the metal frame 46 is mounted inside the outer chassis 11 in the condition in which the metal frame 46 is vertically held between the first case 44 and the second case 45, and the circuit board 48 is mounted inside the outer chassis via the metal frame 46 (see FIG. 16).

In the condition in which the metal frame 46 is mounted inside the outer chassis 11, since the diameters of the shaft sections of the fixing screws 52 are arranged to be smaller than the diameters of the screw threading holes 47*a* of the metal frame 46 as described above, it is arranged that the metal frame 46 can be moved horizontally with respect to the outer chassis 11.

Further, in the condition in which the metal frame 46 is mounted inside the outer chassis 11, there are formed a certain gaps between the circuit board 48 and the first case 44, and the hard disk drive 50 and the second case 45.

As described above, in the information processing device 1, since the circuit board 48 is mounted on the metal frame 46 disposed inside the outer chassis 11, the heat generated by the electronic components 48*a* of the circuit board 48 is discharged outside from the metal frame 46 through the exhaust holes 27 provided to the outer chassis 11, thus the rise in temperature inside the outer chassis 11 can efficiently be suppressed.

In particular, in the small-sized device such as the information processing device 1, since the temperature inside the outer chassis 11 rises easily, by efficiently suppressing the rise in temperature inside the outer chassis 11 as described above, enhancement of the operational reliability of the various sections can be achieved.

Further, since the circuit board 48 is not mounted on the outer chassis 11 but mounted on the metal frame 46, in the case in which vibration or impact is applied from the outside to the outer chassis 11, the applied vibration or the impact is transmitted to the circuit board 48 after damped by the metal frame 46, thus distortion or breakage of the circuit board 48 can be prevented.

Further, although the metal frame 46 is mounted in the condition in which the metal frame 46 is held between the first case 44 and the second case 45, since the diameters of the shaft sections of the fixing screws 52 are arranged to be smaller than the diameters of the screw threading holes 47*a* of the metal frame 46 to allow the metal frame 46 to move horizontally with respect to the outer chassis 11, the vibration or the impact can be absorbed by the metal frame 46 moving horizontally depending on the amplitude of the vibration or the impact transmitted to the metal frame 46.

Further, since the metal frame 46 is made of magnesium, the preferable heat radiation property, high rigidity, and weight saving can be achieved.

In addition, in the information processing device 1, since the hard disk drive 50 is mounted on the metal frame 46, in the case in which the vibration or impact is applied from the outside to the outer chassis 11, the applied vibration or the impact is transmitted to the hard disk drive 50 after damped by the metal frame 46, thus improvement of the operational reliability of the hard disk drive 50 can be achieved.

It should be noted that the directions of back and forth, up and down, and right and left are used for the sake of convenience of explanations, and accordingly, there is no limitation of these directions in applying the present invention.

The specific shapes and structures of the various sections shown in the embodiment section are all nothing more than showing mere examples of the embodiments in putting the invention into practice, and accordingly, the scope of the invention should not be interpreted as limited by such specific shapes and structures of the various sections shown in the embodiment section.

It should be understood by those skilled in the art that various modifications, combinations, sub-combinations and alternations may occur depending on design requirements and other factors insofar as they are within the scope of the appended claims or the equivalents thereof.

The invention claimed is:

1. An information processing device comprising:
   a device main body including a keyboard; and
   a display slidably supported by the device main body, wherein the device main body includes
   a support section for slidably supporting the display, and
   a pair of grip sections positioned on both sides of the display continuously to the support section and to be grasped by the user,
   the pair of grip sections is formed so as to protrude in a display arrangement direction in which the display is arranged with respect to the support section, and
   an operation section to be operated by the user is disposed on a surface of the pair of grip sections in the direction of protrusion.

2. The information processing device according to claim 1, wherein the keyboard is disposed on the support section, and the keyboard is one of opened and closed in accordance with the slide operation of the display.

3. The information processing device according to claim 1, wherein an outer peripheral surface of the pair of grip sections is formed to be a curved surface.

4. The information processing device according to claim 1, wherein a pair of protruding sections distant from each other in a direction along which the pair of grip sections is arranged and protruding towards an opposing direction to the display arrangement direction with respect to the support section is disposed on an opposing surface of the device main body to the surface supporting the display.

5. The information processing device according to claim 4, wherein at least a part of the protruding sections is formed of a battery.

6. The information processing device according to claim 1, wherein a camera section is disposed on a surface of the display facing the support section, and the camera section is one of opened and closed in accordance with the slide operation of the display.

* * * * *